(No Model.)
J. HEILRATH.
ADJUSTABLE VEHICLE SEAT.
No. 424,649. Patented Apr. 1, 1890.
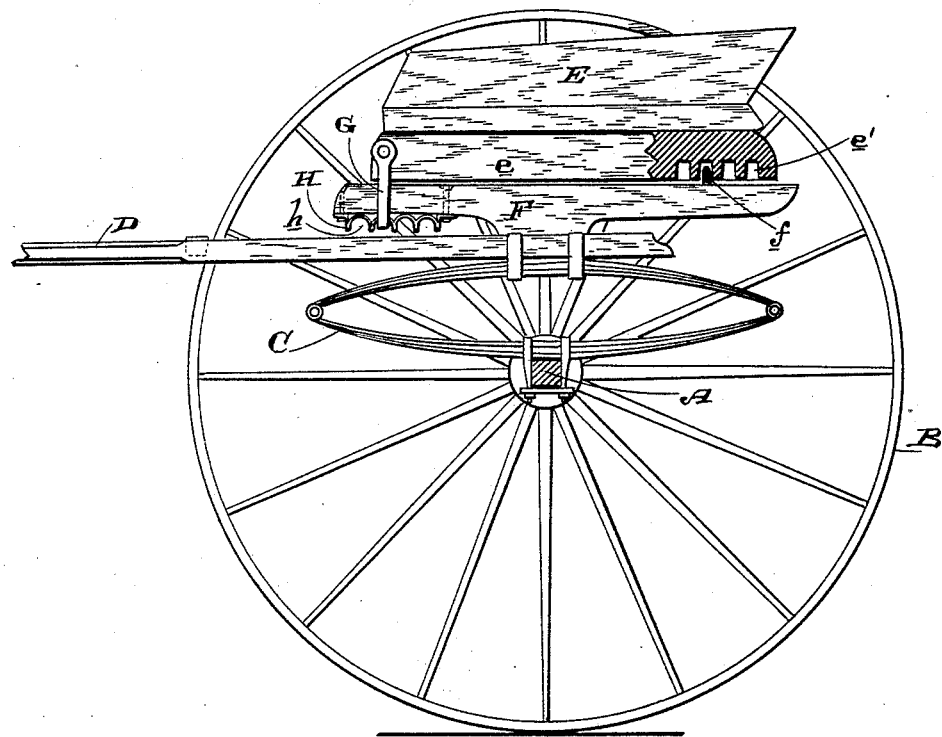
Witnesses,
Inventor
John Heilrath
By Dewey &Co.
Attys

UNITED STATES PATENT OFFICE.

JOHN HEILRATH, OF PLYMOUTH, CALIFORNIA.

ADJUSTABLE VEHICLE-SEAT.

SPECIFICATION forming part of Letters Patent No. 424,649, dated April 1, 1890.

Application filed November 12, 1889. Serial No. 329,976. (No model.)

*To all whom it may concern:*

Be it known that I, JOHN HEILRATH, a citizen of the United States, residing at Plymouth, Amador county, State of California, have invented an Improvement in Adjustable Vehicle-Seats; and I hereby declare the following to be a full, clear, and exact description of the same.

My invention relates, broadly, to the class of vehicles, and especially to two-wheeled vehicles, usually known as "carts."

My invention consists in the novel adjustable seat hereinafter fully described, and specifically pointed out in the claims.

The object of my invention is to provide for properly balancing a cart. This effect is produced by the adjustment forward or back of the seat so as to regulate its position to properly distribute the weight, this being an essential object in two-wheeled vehicles, where the whole weight is borne by the horse, instead of being wholly carried, as in the case of four-wheeled vehicles, by the wheels.

Referring to the accompanying drawing for a more complete explanation of my invention, the figure is a side elevation of a cart, showing the application of my adjustable seat thereto.

A is an axle, B is a wheel, C is a spring, and D is a shaft, of an ordinary two-wheeled vehicle.

E is the seat of the vehicle. Upon the shaft is clipped the supporting-bar F, and upon this rests the sill $e$ of the seat. From the rear end of the supporting-bar extends upwardly a securing-pin $f$, which is adapted to enter any of the series of holes $e'$ in the bottom of the seat-sill. There may be any number of these holes in the series, in practice, say, about four, and by moving the seat forward or back on the support the pin of the support is adapted to enter one or the other of the holes of the seat-sill, thereby holding the seat in place. To properly secure the seat, I have pivoted under the seat, at the forward end of the seat-sill, a clamping-bail G, which is adapted to enter and engage any of a series of grooves $h$, which may be formed in any suitable manner under the forward end of the supporting-bar. In practice they will be formed in a corrugated plate H, secured under the supporting-bar, the corrugations of said plate forming the grooves into which the clamping-bail is adapted to fit. These grooves may be of any suitable number, in practice about four, and are separated by distances corresponding to the distances between the holes in the seat-sill, whereby the clamping-bail may engage a groove corresponding to the hole with which the pin of the supporting-bar fits.

In operation, by raising the rear of the seat so as to free its sill of the pin in the rear end of the bar F the bail at the forward end of the sill may be released from the groove with which it engages, and said seat may then be moved forward or back until its bail engages another groove and the pin enters another hole, whereby the entire seat is secured in its new position. This construction is a simple and effective one, and will allow the seat to be readily moved back or forth to balance the cart properly by distributing the weight, and when the parts are in position the seat is held firmly and securely in place. It will of course be understood that the construction at both ends of the seat is similar.

I do not confine myself to attaching the supporting-bars F to the shafts, for they may be clipped to the springs. The general arrangement here shown illustrates only one form of cart. The essential feature is the adjustable connection between the seat and supporting-bars.

Having thus described my invention, what I claim as new, and desire to secure by Letters Patent, is—

1. In a vehicle, the combination of the vehicle-seat and its supporting-bars with the means for adjustably connecting the seat and bars, whereby the seat can be readily moved back and forth and held in the position to which it is adjusted, consisting of a pin-and-socket connection between one end of the bars and the seat, and swinging clamping-bails and grooves in which they fit at the other end of the bars, substantially as herein described.

2. In a vehicle, the seat thereof and its supporting-bars, in combination with the means for adjustably connecting them, consisting of the pins in one end of the bars, and the series of holes in the seat, with any of which the pins are adapted to engage, the swinging clamping-bails carried by the seat, and the series of grooves in the other end of the bars and with which the clamping-bails are adapted to engage, substantially as herein described.

3. In a vehicle, the seat thereof, having the end sills and the supporting-bars on which the sills rest, in combination with the means for adjustably connecting them, consisting of the pins in the rear end of the bars and the series of holes in the under side of the seat-sills, the swinging clamping-bails secured under the front of the seat, and the series of grooves under the forward end of the supporting-bars and with which the clamping-bails are adapted to engage, substantially as herein described.

4. In a vehicle, the seat thereof, having the sills and the supporting-bars on which said sills rest, in combination with the pins in the rear end of the bars, the series of holes in the under surface of the seat-sills and with which the pins are adapted to engage, the corrugated plates under the forward ends of the bars, and the swinging bails carried by the forward ends of the seat-sills and adapted to engage the corrugations of the plates under the supporting-bars, substantially as herein described.

In witness whereof I have hereunto set my hand.

JOHN HEILRATH.

Witnesses:
JAMES L. DAVIES,
LAZZARO LAGAMARSINO.